(12) United States Patent
Berg et al.

(10) Patent No.: US 10,534,592 B2
(45) Date of Patent: Jan. 14, 2020

(54) TEMPLATE EXPRESSIONS FOR CONSTRAINT-BASED SYSTEMS

(71) Applicant: SAP SE, Walldorf (DE)

(72) Inventors: Patrick Berg, Hockenheim (DE); Conrad Drescher, Heidelberg (DE); Patrick Zimmer, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/901,300

(22) Filed: Feb. 21, 2018

(65) Prior Publication Data
US 2019/0042215 A1  Feb. 7, 2019

Related U.S. Application Data

(60) Provisional application No. 62/542,039, filed on Aug. 7, 2017.

(51) Int. Cl.
*G06F 17/30* (2006.01)
*G06F 9/44* (2018.01)
(Continued)

(52) U.S. Cl.
CPC .............. *G06F 8/427* (2013.01); *G06F 8/20* (2013.01); *G06F 8/35* (2013.01); *G06F 16/9024* (2019.01);
(Continued)

(58) Field of Classification Search
CPC .......... G06F 17/243; G06F 8/10; G06F 17/11; G06F 17/50; G06F 8/313; G06F 8/427;
(Continued)

(56) References Cited

U.S. PATENT DOCUMENTS 8,656,372 B2  2/2014 Vargas
8,732,732 B2  5/2014 Meijer et al.
(Continued)

OTHER PUBLICATIONS

J. Hewson, Constraint-based specifications for system configuration, University of Edinburgh, 121 pages (Year: 2013).*
(Continued)

*Primary Examiner* — Thuy Dao
(74) *Attorney, Agent, or Firm* — Klarquist Sparkman, LLP

(57) ABSTRACT

Technologies are provided for creating and using template constraint expressions in constraint-based systems. Template constraint expressions can be created that can be used to define multiple usages of a same constraint rule in a configuration model. Using the template constraint expression, the constraint rule can be translated once and used multiple times as different instances of the rule are activated. Updates to the rule can be made to the template constraint expression and applied to all of the related instances. Constraint expressions can be created based on the template constraint expression. Multiple object instances in a configuration model can be identified that satisfy matching criteria of the template constraint expression. Variables of the matching object instances can be mapped to variable placeholders in the template constraint expression to create constraint expressions. A constraint solver can be used to evaluate the constraint expressions.

19 Claims, 8 Drawing Sheets

(51) Int. Cl.
*H04L 12/24* (2006.01)
*G06F 17/27* (2006.01)
*G06F 8/41* (2018.01)
*G06F 8/20* (2018.01)
*G06F 8/35* (2018.01)
*G06F 16/901* (2019.01)
*G06Q 30/06* (2012.01)
*G06Q 10/04* (2012.01)
*G06F 8/36* (2018.01)

(52) U.S. Cl.
CPC ..... *G06F 16/9027* (2019.01); *G06Q 30/0621* (2013.01); *G06F 8/36* (2013.01); *G06F 8/433* (2013.01); *G06Q 10/04* (2013.01)

(58) Field of Classification Search
CPC ..... G06F 8/20; G06F 8/35; G06F 8/36; G06F 8/433; G06F 11/263; G06F 17/504; G06N 5/00; G06N 5/045
See application file for complete search history.

(56) References Cited

U.S. PATENT DOCUMENTS

| | | | |
|---|---|---|---|
| 9,026,903 | B1 | 5/2015 | Michael et al. |
| 9,158,503 | B2* | 10/2015 | Misbhauddin ............ G06F 8/72 |
| 9,280,584 | B2* | 3/2016 | Bornea ............ G06F 16/24545 |
| 9,411,581 | B2 | 8/2016 | Peled |
| 9,606,964 | B1* | 3/2017 | Anjomshoa ............... G06F 8/34 |
| 9,672,474 | B2 | 6/2017 | Dirac et al. |
| 9,983,977 | B2* | 5/2018 | Chavez ..................... G06F 8/20 |
| 10,025,572 | B2 | 7/2018 | Cheriton |
| 2004/0015506 | A1 | 1/2004 | Anonsen et al. |
| 2008/0155498 | A1 | 6/2008 | Donovan et al. |
| 2008/0229261 | A1 | 9/2008 | Rajamani et al. |
| 2011/0004834 | A1 | 1/2011 | Martino et al. |
| 2011/0246549 | A1* | 10/2011 | Katzenberger .......... G06F 9/505 709/201 |
| 2012/0215731 | A1* | 8/2012 | Junker ................... G06N 7/005 706/47 |
| 2014/0143604 | A1* | 5/2014 | Li ....................... G06F 11/3684 714/38.1 |
| 2015/0100568 | A1* | 4/2015 | Golden .................... G06N 5/02 707/722 |
| 2015/0379426 | A1 | 12/2015 | Steele et al. |
| 2018/0145879 | A1 | 5/2018 | Cook et al. |

OTHER PUBLICATIONS

Felgentreff et al., Automatically selecting and optimizing constraint solver procedures for object-constraint languages, 8 pages (Year: 2016).*

Cutulenco et al., Mining timed regular expressions from system traces, 8 pages (Year: 2016).*

"Object Dependency," SAP Community WIKI, wiki.scn.sap.com, visited Aug. 3, 2017, 18 pages.

Erdweg et al., "Modular Specification and Dynamic Enforcement of Syntactic Language Constraints when Generating Code," 12 pages, Apr. 2014.

* cited by examiner

FIG. 4

```
TestSpace home;

IntVarArray intvars (home, 3, 0, 3);
   FloatVarArray floatvars (home, 3, 1, 3);

trace (home, intvars);        404
   trace (home, floatvars);      406

412
   BoolExpr e1 (intvars[0] + intvars[1] == 1 || intvars[2] == 1);
   BoolExpr e2 (intvars[2] > 2 && floatvars[0] + floatvars[1] < 2.5);
                      414

PropagatorGroup g1;    408
   PropagatorGroup g2;    410 rel (g1 (home), e1);
   rel (g2 (home), e2);
```

402 (braces around the above block)

```
trace<Int>::init(id:0) slack: 100.00% (9 values)
trace<Float>::init(id:1) slack: 100.00% (6 width)
trace<Int>::prune(id:0): [2] = 3 - {0..2} by post(g:3)
trace<Int>::prune(id:0): [0] = [0..1] - {2..3} by
propagator(id:2,g:2)       452
trace<Int>::prune(id:0): [1] = [0..1] - {2..3} by
propagator(id:2,g:2)
trace<Float>::prune(id:1): [0] = [1..1.5] - [1.5..3] by
propagator(id:6,g:3)       454
trace<Float>::prune(id:1): [1] = [1..1.5] - [1.5..3] by
propagator(id:6,g:3)
trace<Int>::fix(id:0) slack: 22.23% - 77.78%
trace<Float>::fix(id:1) slack: 50.00% - 50.00%
```

450

TEMPLATE EXPRESSIONS FOR CONSTRAINT-BASED SYSTEMS

CROSS REFERENCE TO RELATED APPLICATION

This application claims the benefit of U.S. Provisional Application No. 62/542,039, entitled TEMPLATE EXPRESSIONS, filed on Aug. 7, 2017, which is incorporated by reference herein in its entirety.

BACKGROUND

At least some frameworks for developing constraint-based systems, such as the open-source constraint solver Gecode, allow programmers to describe constraints and entity relationships in model definitions. In at least some of these frameworks, configuration models can be defined using declarative variable definitions and constraints defined using the variables. However, in at least some of the frameworks, constraint definitions are parsed and instantiated independently.

Therefore, there is room for improvement in technologies related to configuration models.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises receiving a configuration model definition comprising multiple configuration rule definitions; generating a template constraint expression for one of the configuration rule definitions, wherein the template constraint expression comprises one or more variable placeholder identifiers; generating a constraint expression for the one of the configuration rule definitions using the template constraint expression, wherein generating the constraint expression for the one of the configuration rule definitions comprises mapping one or more variables associated with the configuration rule definition to the one or more placeholder identifiers of the template constraint expression; and using a constraint solver to evaluate the generated constraint expression.

In another embodiment, a system comprises a computing device comprising one or more processors configured to perform operations, the operations comprising receiving a configuration model definition comprising multiple configuration rule definitions for evaluation using a constraint solver; generating a template constraint expression for one of the configuration rule definitions, wherein the template constraint expression comprises a variable placeholder identifier; and generating one or more constraint expressions using the template constraint expression, wherein generating a constraint expression comprises mapping one or more variables to the one or more variable placeholder identifiers of the template constraint expression.

In another embodiment, one or more computer-readable media store instructions that, when executed by one or more processors, cause the one or more processors to perform operations, the operations comprising receiving a configuration model definition comprising an object instance graph and multiple configuration rule definitions; generating a template constraint expression for one of the configuration rule definitions, wherein the template constraint expression comprises matching criteria and a variable placeholder comprising a variable qualifier; generating multiple constraint expressions using the template constraint expression; and evaluating the constraint expression using a constraint solver. The generating the constraint expressions comprises identifying multiple subgraphs of object instances in the object instance graph that satisfy the matching criteria of the template constraint expression; and generating a constraint expression for each of the identified subgraphs, wherein generating a constraint expression comprises mapping a variable of a subgraph to the variable placeholder of the template constraint expression using the variable qualifier.

As described herein, a variety of other features and advantages can be incorporated into the technologies as desired.

BRIEF DESCRIPTION OF THE DRAWINGS

FIG. 4 depicts an example program comprising example trace operators and a resulting trace report.

DETAILED DESCRIPTION

Example 1—Overview

Figure 1:
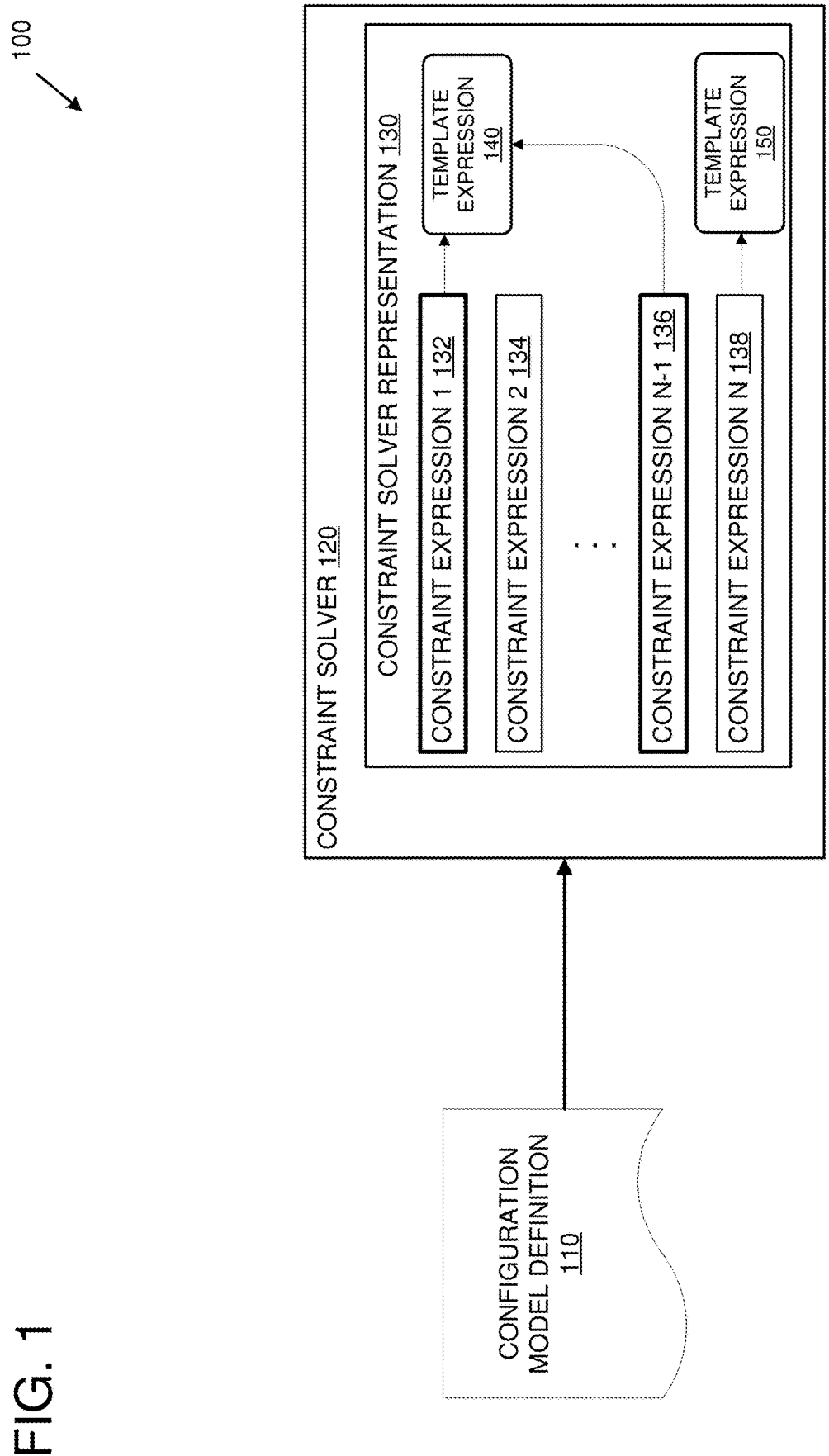
FIG. 1 is a system diagram depicting an example system for constraint evaluation using template constraint expressions.

Configuration models for configurable products (like e.g. cars, office equipment, airplanes, industrial machines, industrial shop-floors, projects, or the like) can include one or more configurable instances. For example, when configuring an entire shop-floor, the shop-floor contains a varying set of machines (for example, represented by object instances), each of which can be configured again themselves. Configuration models can describe a set of admissible configurations via so-called configuration rules (sometimes referred to as "object dependencies"). Such configuration rules can comprise complex statements describing relationships between variables belonging to various instances. In at least some models, a same rule may be used multiple times. In particular, a given rule definition may match the characteristics of different object instances in a configuration object graph. Moreover, this set of matching instances may change dynamically during a configuration using the configuration model. The different instantiations of the rule need to be processed correctly for correct configuration results. However, in at least some current frameworks for solving constraint-based systems, these rule definitions are parsed and processed separately by a dependency engine for each matching instance (or combination of matching instances). Thus, in such frameworks a same rule may be parsed and evaluated multiple times. Furthermore, updates to the rule may have to be made to each parsed rule instantiation separately.

Various technologies described herein can be used to create template constraint expressions that can be used to process multiple occurrences of a same configuration rule in a configuration model. Updates to the rule can be made to the template and applied to all of the related rule instantiations automatically. A new dependency engine can be provided that is configured to support template constraint expressions. For the dependency engine, a constraint solver (e.g., the open-source constraint solver Gecode) can be used. The dependency engine can be configured to support configuration model definitions comprising one or more template constraint expressions. Example libraries for defining configuration models include the Gecode MiniModel library. Other libraries offering incremental model extensibility can be used in place of MiniModel. Such a modeling library can be modified using various technologies described herein to support the definition of template constraint expressions.

In MiniModel, object dependencies are represented as so-called "Boolean expressions." However, these Boolean expressions can only be built atop concrete variables belonging to a particular constraint instance. This means that, whenever the set of configurable instances that are matched by an object dependency changes, the complete object dependency expression is rebuilt from the dependency's representation the configuration model, but with different variables. This can mean that multiple combinations of instances matched by one dependency in the configuration model can result in multiple translation steps of the dependency into a constraint-solver representation.

Moreover, these object dependency expressions cannot be created independently from a so-called constraint-solver space. This means that it may not be possible, using current frameworks, to create an object dependency expression representing one concrete instantiation of a dependency at model load-time and to apply the dependency later on a different constraint-solver space, when the dependency is needed for processing.

At least some of the technologies described herein can be used to create template constraint expressions in order to translate a given dependency into a durable representation of an object dependency expression for a constraint-solver (such as Gecode). Placeholders can be used instead of concrete variables in the constraint-space representation of the configuration model. This template constraint expression can be copied later on for each object instance in a configuration object graph that matches the dependency. Each copy can then reference a different suitable set of constraint-engine variables on demand Thus, the output of the parsing process of a dependency can contain sufficient (e.g., all) information relevant for matching a suitable set of variables like characteristic/instance data as placeholders.

In at least some embodiments, multiple usages of a given dependency can be accomplished with a single translation step of the dependency. Moreover, this representation can be stored across multiple clone-operations on multiple constraint-solver spaces. This can allow introduction of a clear separation between the translation of dependencies and the actual processing in the constraint-solver.

Moreover, in at least some embodiments the technologies can reduce the overall time for translating and activating dependencies from "TimeForParsing*(NumberOfMatchings*TimeForMatching)" to "TimeForParsing+(NumberOfMatchings*TimeForMatching)."

Example 2—Example Configuration Model Definitions

In any of the examples described herein, a configuration model can be defined that declaratively represents constraint relationships for variables in a given system. Such a configuration model definition can be used to enter configuration rules into a constraint solver (such as Gecode or the like) to create a constraint solver representation of the configuration model. In at least some cases, the configuration model can comprise an object graph. Such an object graph can comprise multiple object instances linked by relationships (such as dependency relationships, parent-child relationships, aggregation relationships, etc.). In a particular embodiment, the object graph comprises object instances organized in a tree data structure, wherein a root node represents a configuration and intermediate nodes and leaf nodes represent components of the configuration, wherein child nodes represent sub-components of components represented by parent nodes. In at least some cases, the intermediate and/or leaf nodes can represent component object instances, wherein a given object instance can comprise one or more variables.

In at least some embodiments, a same configuration rule can be reused with different variables. When a model definition containing such rule re-usage is translated into a constraint solver representation, separate instances of rule objects may be instantiated for each usage of the rule. In at least some cases, the separate instances may be activated at different times during processing using the constraint solver.

In at least some cases, configuration rules in a configuration model definition can be parsed and translated to into expressions (such as Gecode Boolean expressions, or the like) when the configuration model is translated (or loaded) into the constraint solver representation. For each configuration rule, a template constraint expression (such as a template Boolean expression, etc.) can be defined with variables and/or variable arrays replaced by placeholders identifiers. Placeholder identifiers can define criteria for matching object instances in a configuration model to the placeholder identifiers. Additionally or alternatively, a placeholder instance can identify variables and/or variable arrays of the matching object instances that can be substituted for the placeholder identifiers in the template constraint expression. Thus, instantiations of the rule can be created by resolving the configuration object instance criteria of the template constraint expression against a currently active set of configuration instances, resulting in a rule instantiation per matching combination of configuration object instances.

In a particular embodiment, a group identifier (such as a MiniModel propagator group identifier) can be passed to an expression when it is processed. For example, in at least some cases this can be a prerequisite for identifying the object dependency expression in a trace operation using the constraint solver representation of the configuration model. Such group identifiers can be used to differentiate between multiple instances of a configuration rule represented by a template constraint expression. For example, for each placeholder object, a different group identifier can be used to identify specific variables and/or variable arrays to be used as input to the template constraint expression when evaluating the template constraint expression as a concrete object dependency expression.

FIG. 1 is a system diagram depicting an example system for constraint evaluation using template constraint expressions. The example system 100 comprises a configuration model definition 110. The configuration model definition 110 can be a definition of a configuration model as described herein. For example, a modeling framework (such as the MiniModel framework) can be used to define the configuration model definition 110. The configuration model definition 110 can comprise one or more constraint rules (or configuration rules, etc.) that can define expressions involving various variables. Such expressions can comprise enforceable relationships among the various variables.

The example system 100 comprises a constraint solver 120. The constraint solver 120 can comprise one or more hardware and/or software components of the one or more computing devices. In a particular embodiment, the constraint solver 120 can comprise an extension of an extendable constraint solver (such as Gecode). The constraint solver 120 can be configured to receive the configuration model definition 110 and to parse the configuration model definition 110 to create a constraint solver representation 130 of the configuration model definition 110. For example, the constraint solver representation 130 can comprise a translation of the configuration model defined by the definition 110 and to one or more constraint expressions 132-138 that can be evaluated by the constraint solver.

The constraint solver 110 can be configured to parse rule definitions in the configuration model definition 110 and to generate template constraint expressions (e.g., 140 and 150) based on the rule definitions. In at least some cases, the constraint solver 120 can identify multiple combinations of object instances in the configuration model that match a same rule (i.e., two or more separate sets of one or more object instances that involve usages of a same rule). For example, a same rule may be used multiple times, but with one or more different variables.

The constraint solver 120 can be configured to generate template constraint expressions to represent such rule usages. A template constraint expression (e.g., 140) can be created to represent an abstraction of a rule. Constraint expressions (e.g., 132-138) can be created by matching the template constraint expressions to object instances in the object graph of the configuration model definition 110. In scenarios where more than one set of object instances in the model definition 110 match a same template constraint expression (e.g., 140)template constraint expression, constraint expressions (e.g., 132 and 136) can be created using the same matched template constraint expression (e.g., 140).

For example, when parsing the rule definitions of the configuration model definition 110, the constraint solver 120 can identify a rule definition and can generate the template constraint expression to represent the rule with placeholder identifiers instead of concrete variables. Object instances in the model definition 110 can be matched to the placeholder identifiers of the template constraint expression, and constraint expressions can be generated by mapping variables of the matched object instances for the placeholder identifiers in the template constraint expression. The constraint expressions (e.g., 132 and 136) can then be evaluated by the constraint solver 120 using the mapped object instance variables.

Figure 2:
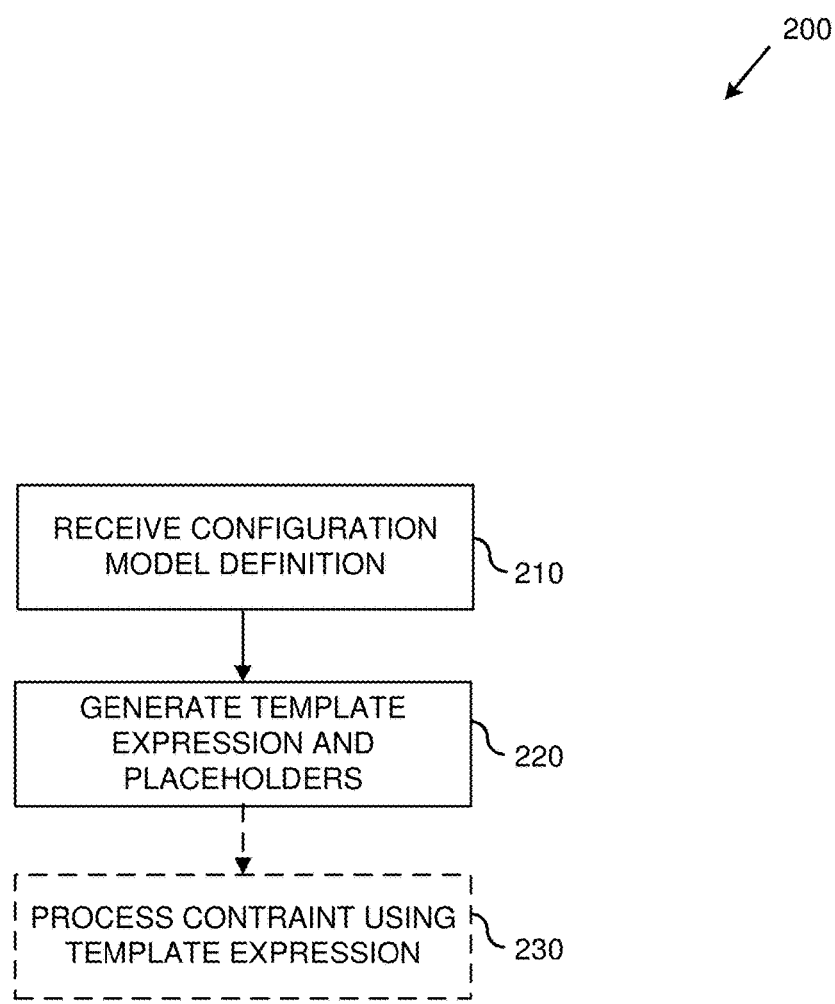
FIG. 2 is a flowchart of an example method for generating template constraint expressions.

FIG. 2 is a flowchart of an example method 200 for generating template constraint expressions. Any of the example systems described herein can be used to perform the example method 200.

At 210, a configuration model definition is received. The configuration model can be a configuration model as described herein. For example, the configuration model can comprise an object graph and multiple configuration rule definitions. In at least some embodiments, the configuration rule definitions can comprise object dependency definitions.

At 220, template constraint expressions, as described herein, are generated for the configuration rule definitions. A template constraint expression can comprise one or more variable placeholder identifiers in the place of concrete variables associated with a rule definition. The template constraint expression can also include matching criteria that can be used to match one or more object instances of the configuration model object graph. The variable placeholder identifiers can comprise variable identifiers and variable qualifiers that can be used to identify concrete variables in a matching object instance. The variable qualifiers can be used to look up variable values to be used in place of the placeholder identifiers when evaluating the expression. In at least some cases, the matching criteria and/or the variable qualifiers can be defined using a query syntax.

Optionally, at 250 constraint expressions are created and processed using the template constraint expression. When a configuration rule needs to be processed, one or more expressions can be generated by replacing the placeholder identifiers in a template constraint expression for the configuration rule definition with concrete variables in matching subgraphs of the configuration model. For example, the matching criteria of the template constraint expression can be used to identify a subgraph of object instances in the configuration model. Identifying the subgraph can comprise traversing the object graph of the configuration model and identifying a subgraph of object instances that satisfies the criteria. Variable values in the subgraph can be mapped to the placeholder identifiers of the template constraint expression using the variable qualifiers. A constraint expression can then be generated by substituting the identified variable values for the placeholder identifiers in the template constraint expression.

In at least some cases, a single template constraint expression can be used to generate multiple constraint expressions. For example, when multiple object instance subgraphs in the configuration model satisfy the matching criteria for the single template constraint expression, separate constraint expressions can be generated for each matching subgraph.

Example 3—Example Template Constraint Expressions

In any of the examples described herein template constraint expressions can be provided that represent abstractions of multiple usages of a same rule in a configuration model definition. Example template constraint expressions include template object dependency expressions (such as template Boolean expressions, or the like). In at least some embodiments, template constraint expressions can be represented as instances of constraint solver expressions with placeholder identifiers substituted for variables. For example, a template Boolean expression (TBE) can be used to store a Gecode Boolean expression with variables replaced by placeholders. Given a mapping of placeholder identifiers to variables for each usage of the constraint rule, the template constraint expression can be posted to a constraint solver for processing as if it were a normal expression. However, the same template constraint expression can be used for multiple posts of the same configuration rule, but with different variables.

Figure 3:
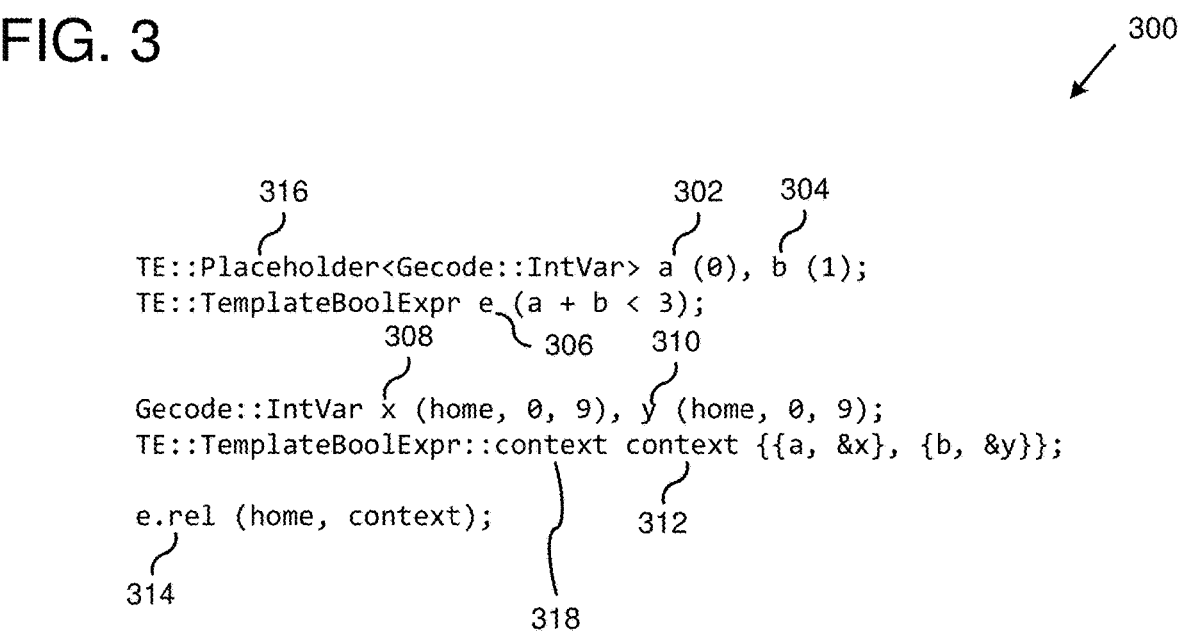
FIG. 3 depicts an example code snippet for creating and posting an example template constraint expression.

FIG. 3 depicts an example code snippet 300 for creating and posting an example template constraint expression 306.

The template constraint expression 306 can be posted using a mapping of variables to placeholders (in this example represented by a context object 312). Placeholders (e.g., 302 and 304) can be defined and used in place of variables in the template constraint expression 306. At a later point, variables (e.g., 308 and 310) can be used to create a context 312 that is passed to a function 314 of the template constraint expression 306 to post an instance of the template constraint expression with the variables 308 and 310 substituted for the placeholders 302 and 304, respectively.

A class 316 can be defined and used create instances of placeholders. In at least some embodiments, the class 316 can be a simple wrapper for an index variable to ensure type safety. The type of a variable that a placeholder represents can be provided as a template argument. For example, in FIG. 3, placeholders 302 and 304 are defined as placeholders for the "Gecode::IntVar" variable type. This type information can be used to select a correct overloaded function when creating the template constraint expression 306. Supported functions can be defined in source files associated with the template constraint expression codebase. In at least some embodiments, the functions can correspond to existing default functions and/or user-defined extensions.

A class 318 can be defined and used to create variable mapping contexts (e.g., 312). In a particular embodiment, the class 318 comprises an unordered map data structure. Elements of an instance of the class 318 can comprise pairs of placeholder identifiers and mapped variable identifiers. In at least some embodiments, placeholder values can be distinct, irrespective of a specified variable type for the placeholder.

In an embodiment comprising an execution environment that supports implicit conversion, signatures for placeholder, template constraint expression, and mapping classes can be defined in such a way to allow for use of the template constraint expression objects by a pre-defined constraint solver as if they were normal expression objects.

In at least some embodiments, a template constraint expression can be defined as a syntax tree. For example, a syntax tree can be created that comprises nodes that are instances of a Node class. Instances of the Node class can store a type and links to related data. The node type can encode a constant, a placeholder, and/or function with type information (e.g., a variable type for a placeholder, a function signature for a function, etc.). A placeholder value can be stored as data of a node in the syntax tree. In at least some embodiments, constants can be dynamically constructed and/or destructed in order to reduce the size of a Node class instance. In at least some cases, this can reduce the time and/or memory required to traverse the syntax tree.

Variable type information can be encoded using one or more template parameters of a template constraint expression class. In at least some embodiments, such template parameters can be used to define functions in the template constraint expression class that correspond to default functions in a base modeling framework. For example, for a MiniModel function (such as "Gecode::LinFloatExpr abs (Gecode::LinFloatExpr)") a corresponding function "TemplateExpr<Gecode::LinFloatExpr> abs (TemplateExpr<Gecode::LinFloatExpr>)" can be defined in the template constraint expression class using a template parameter.

Additionally or alternatively, more specific template constraint expression subtypes can be based on a more general template constraint expression super type. For example, a template Boolean expression type "TemplateBoolExpr" can be defined as an alias for a template constraint expression class with a template parameter set to a Boolean type (such as "TemplateExpr<Gecode::BoolExpr>").

In at least some embodiments, a template constraint expression base class can be defined identifies supported tree node types. Additionally or alternatively, the template constraint expression base class can be configured to perform support functions, such as reference counting for nodes in the syntax tree, syntax tree traversal operations, etc. For example, tree traversal can be implemented as an iterative algorithm. In at least some cases, this can be helpful for avoiding execution stack-related errors that can occur in some recursive implementations. Tin at least some cases, temporary data can be stored in a data structure container (such as a stack data structure) that is allocated on the heap. For instances defined as constants, only references (or pointers) may be stored as temporary data, when the actual data is already stored in the syntax tree nodes. This can reduce the size of the data structure on the heap.

A template constraint expression can be posted to (i.e., processed by) a constraint solver. In at least some embodiments comprising a constraint solver that supports constraint expressions, a template constraint expression can be used to generate a constraint expression with a particular set of variables. For example, a template Boolean expression comprising a syntax tree can be created based on a configuration rule, a Boolean expression can be created by traversing the syntax tree with a concrete set of variables, and the Boolean expression can then be processed by a constraint solver.

Node type tokens can be provided that can be used to define function signatures. In at least some embodiments, node type tokens (and template constraint expression functions) can be created with macro definitions. Using a macro definition, a function signature can be defined once and referenced multiple times. For example, one or macros can be used to define signatures for unary functions with parameters for defining a namespace, a function name, a return type, an argument type, etc. Token values can be constructed using such a macro during traversal of a syntax tree for a template constraint expression. In a particular embodiment, files containing macro definitions can be included in a template constraint expression codebase.

In at least some embodiments, new functions can be added to the system by including function signatures in one or more such macro definition files. Additionally or alternatively, new variable types, constant types, and/or relevant constructors can be defined in one or more such macro definition files. New tokens, template constraint expression functions, and/or expression syntax trees can be modified automatically based on updated macro definitions.

Additionally or alternatively, tests for new functions can be automatically generated based on such updated macro definitions. Functional correctness of a template constraint expression can be tested by instantiating the template constraint expression, generating an expression using the template constraint expression, posting the generated expression, and comparing the posted generated expression with a directly posted expression with respect to a computed final variable domain.

For posting a template constraint expression, a relative performance, as well as an absolute time required, can be measure with respect to a directly posted expression. At least some configuration models comprise several relatively small expressions (e.g., at most ten comparisons per expression) mixed with a few relatively large expressions (e.g., several thousand comparisons per expression). Performance testing can be used to determine an extent to which expression size and/or a total comparison count has an impact on processing time.

In at least some embodiments, configuration models can be multi-level configuration models. In such an embodiment, a dependency representation can be translated once using a template constraint expression and instantiated multiple times with the variables belonging to the set of active instances across a plurality of levels of the multi-level configuration model.

Example 4—Example Template Constraint Expression Propagators

In any of the examples described herein, propagators can be provided that can be used to generate expressions given a template constraint expression.

For example, separate propagators (or propagator groups) can be used to map separate variable sets to separate concrete instances of a template constraint expression. In a particular example, a propagator group identifier can be passed to a Boolean expression in MiniModel when posting it. A different propagator group identifier can be passed to separate concrete instantiations of a template Boolean expression to generate a Boolean expression that can then be posted to a constraint solver (such as Gecode). For example, in Gecode a propagator group "pg" may be passed to a "home" constraint space, as in the example statement "rel (home(pg),x==1)".

In at least some embodiments, additional variable types and/or constraint libraries are defined to enable support for these additional variable types and/or constraints in conjunction with template constraint expressions in an existing constraint solver framework (such as is provided by Gecode, etc.). Such additional variable types and/or constraints can be used in template constraint expressions and, thus, can be used as part of expressions processed by a constraint solver for which the template constraint expression can be converted to an expression. In a particular example, a Boolean combination can be created between native constraints of a constraint solver and one or more of the additional constraints.

In at least some cases, additional propagators can be created and used with template constraint expressions to generate expressions that use one or more of the additional variable types and/or constraints. In at least some such embodiments, such propagators can be used as functions in expressions generated using a template constraint expression.

For example, "not specified" propagators can be defined. A "not specified" propagator can be used to check whether a given variable has been assigned at a particular point in time. Example variable types for which "not specified propagators can be defined include string variables, string set variables, integer variables, set variables, floating-point precision variables, etc.

For example, "specified" propagators can be defined. A "specified" propagator can be used to assign a value to a Boolean variable based on whether a given variable has been assigned a value. For example, if the given variable has been assigned at least one value at the time the propagator is posted, the Boolean variable can be assigned a value of true. If the given variable has not been assigned at least one value at the time the propagator is posted, the Boolean variable can be assigned a value of false. Additionally or alternatively, a "specified" propagator can be defined that can be used to fail a constraint space if a given variable has not been assigned at least one value at the time the propagator is evaluated. In at least some embodiments, a single signature can be used to define both types of "specified" propagators. For example, the signature of the "specified" propagator can include a parameter that can be used to indicate which type of "specified" propagator is desired. Example variable types for which "not specified propagators can be defined include string variables, string set variables, integer variables, set variables, floating-point precision variables, etc.

Additionally or alternatively, an inverse of the "specified" propagator can be defined that can be used to yield the opposite result of the "specified" propagator. For example, such a propagator can assign a value of true to a Boolean variable if a given variable has not been assigned at least one value. The propagator can assign a value of false to the Boolean variable (or fail a constraint space) if the given variable has been assigned at least one variable at the time the propagator is posted. In at least some embodiments, changes to the Boolean variable can be ignored until the given variable is assigned a value.

For example, "power" propagators can be provided that can be used to raise a given integer variable and/or floating-point number variable by a given power. The result of the operation can be assigned to another given integer variable or floating-point number variable. In at least some embodiments, the given power can specified as an integer variable. The propagator can be configured to delay the operation until the specified integer variable is assigned a value.

For example, a "ceiling" propagator can be defined that can be used to round a floating-point variable towards positive infinity. For example, a "ceiling" propagator can round up a value of one floating-point variable to another floating-point variable. Similarly, a "floor" propagator can be defined that can be used to round a floating-point variable towards negative infinity. A "truncation" propagator can be defined that can combine the behavior of the "ceiling" and "floor" propagators. For example, if a given floating-point variable is greater than or equal to zero, the "floor" propagator can be applied. If the given floating-point variable is less than zero, then the "ceiling" propagator can be applied.

For example, a "fractional" propagator can be applied that can be used to denote that a first floating-point variable contains (or should contain) a value that is the fractional part of a value of a second floating-point variable. Upon posting of the propagator, the first floating-point number can be restricted to a range of possible values greater than or equal to zero and less than one. If the second floating-point variable is assigned a value at the time of posting, then the first floating-point variable can be assigned a value equal to the fractional part of the second floating-point variable's value.

For example, "sign" propagators can be defined that can be used to assign a value to one variable based on a sign of a value of another variable. Sign propagators can be defined for use with integer variables and/or floating-point variables. The propagator can assign a value of one to a variable based if another given variable is greater than zero. The propagator can assign a value of negative one to the variable based if the other given variable is less than zero. In at least some embodiments, a value of zero can be assigned to the variable if the other given variable has a value equal to zero.

In at least some embodiments, a "sign" propagator can restrict the sign variable according to a source variable's range (i.e., the value of the sign variable can be set to an integer value if the source variable is an integer variable and the value of the sign variable can be set to a floating-point value if the source variable is a floating-point variable). The "sign" propagator can be used in mixed integer-floating point expressions-functions.

Example 5—Example Mixed Integer-Floating-Point Expressions

In any of the examples described herein, expression types can be provided to support the use of template constraint expressions to generate mixed integer-floating-point expressions. A mixed integer-floating-point expression is an expression comprising one or more operations involving at least one integer variable and at least one floating-point variable.

For example, new converting expression types can be defined that can be used to convert between integer variables and floating-point variable. In at least some embodiments, the new expression types can inherit from existing base expression type in order to enable their use in an existing constraint-solver framework. In a particular embodiment, the base expression types can be defined as abstract base classes that declare virtual post functions. The new converting expression types can be sub-classes that override the virtual post function.

Additionally or alternatively, relational constraint expression types can be defined that can be used to evaluate relationships between integer variables and floating-point variables. For example, equality operator expression types can be defined that can be used to create Boolean expressions that evaluate equality of integer variables and floating-point variables. In a particular embodiment, relational constraint expression types can be configured to map to existing expressions involving two floating-point variables after converting an integer variable to a floating-point variable.

For example, a channel constraint expression type can be defined that can be used to bind a floating-point variable to the integer domain. Such a channel constraint expression type can be used to convert an integer variable to a floating-point variable. In such an expression type, an overloaded post function can be used to effect the conversion of the integer variable to a floating-point variable bound to the integer domain that can be used as input as a floating-point variable in one or more other expressions.

In at least some embodiments, channel constraint expression types can be defined that can be used to substitute auxiliary floating-point variables for integer variables used in mixed integer-floating-point expressions. For example, given an expression such as "IntVar1=IntVar2*2.4," auxiliary floating-point variables can be substituted through the use of channel constraint expressions (such as "channel (FloatVar1,IntVar1)" and "channel(FloatVar2,IntVar2)" that take their initial lower and upper bounds from the integer variables to produce an alternative expression such as "FloatVar1=FloatVar2*2.4." Additionally or alternatively, channel constraint expression types can be defined that can convert floating variables to integer variables.

Channel constraint expression types can be used to support mixed integer-floating-point expressions by introducing auxiliary floating-point variables and/or integer variables wherever needed. Thus, expressions such as expressions like "FloatVar1=IntVar1*FloatVar2" can be supported. In at least some embodiments, rounding issues can be avoided by configuring an assignment expression involving an assignment of a floating-point variable value to an integer variable if the value of the floating-point variable is not integral.

Using channel constraint expressions and auxiliary floating variables, an expression taking a form of "LHS REL RHS" can be translated to an expression having the form "TOFLOAT(LHS) REL TOFLOAT(RHS)." In at least some embodiments, such translations can be performed implicitly. For example, an expression "IntVar=FloatVar+2" can be transformed to an expression such as "AuxFloatVar=FloatVar+2" using a channel expression, such as "channel(IntVar,AuxFloatVar)." The "AuxFloatVar" can be constrained to a value domain of valid integer values. The channel constraint can enforce that the "IntVar" variable may take only values in the range of valid values for the "AuxFloatVar" variable, which may be restricted by the equation of the example expression. If the range of the "AuxFloatVar" variable contains no more integral values, the constraint can fail (and/or raise an inconsistency). An attempt to assign a non-integral value may cause an inconsistency.

Such transformations can be used when not all variables or constants in an expression have a same variable type (e.g., integer or floating-point). An integral floating-point constant (e.g., 1.000) can be considered valid for an integer expression.

A modeling framework (such as MiniModel) can be extended to support mixed integer-floating-point expressions using template constraint expressions. For example, a mixed expression type can be defined that supports various operations involving integer variables, floating-point variables, and/or a combination thereof. Example operations that can be supported include: plus, minus, divide, multiply, abs, sqr, sqrt, nroot, pow, unary minus, sign, frac, ceil, color, trunc, sum, min, max, exp, log, sin, cos, tan, a sin, a cos, a tan, etc. The mixed expression type can define relational expression types that can be used to relate mixed expressions with other mixed expressions. Example relations that can be supported include: equal to, not equal to, less than, less than or equal to, greater than or equal to, greater than, etc.

At least some modeling frameworks (such as MiniModel) automatically convert floating-point constants in integer expressions to integers. Mixed expression types can be used to ensure that such implicit conversions do not occur, but that correct channeling is performed instead. For example, when the expression is parsed, floating-point variables can be substituted for the floating-point constants. An implicit conversion by the framework can then be avoided and mixed expression types can be used to evaluate the expressions.

In at least some embodiments, mixed integer-floating-point expressions can be supported with multi-value variable types. For example, expressions that involve floating-point set variables, integer set variables, and/or some combination thereof can be supported. Propagators can be defined for set evaluation operations involving a mixture of integer and floating-point variables (such as "in" propagators, "not in" propagators, comparison propagators, etc.). Such propagators can be implemented using channel constraint expression types as described herein. For example, an "in" propagator can be defined that can be used to determine whether a value of a given floating-point variable is in an integer set variable, etc.

In at least some embodiments, an "in" and "not in" set operations can be using a "singleton" propagator. For example, an "in" set operation may be modeled using an expression such as "singleton(IntExpr)=<SetExpr" and a "not in" operation may be modeled using an expression such as "singleton(IntExpr)||SetExpr." However, it may not be possible in at least some cases to define a new "singleton" propagator for use with a mixed expression type. For example, an expression such as "FloatVar not in IntSetVar"

may fail (or result in an inconsistency) if the "FloatVar" variable has a non-integral value (such as 1.5). However, an expression taking a form of "1.5 not in IntSetVar" should evaluate to true since a non-integral floating-point value cannot be in an integer set.

This issue can be addressed by including a negation into an auxiliary floating-point expression. For example, an expression "FloatExpr not in SetVar" can be translated as: "FloatExpr !=AuxFloatVar AuxIntVar in SetVar %% safe to use singleton(AuxIntVar=<SetVar) channel(AuxFloatVar, AuxIntVar)."

By the "in" constraint, the "AuxIntVar" will get the assigned and possible values of "SetVar" as a value domain. Using the channel expression, these are transformed to the corresponding floating-point value range for the "AuxFloatVar" variable. This "AuxFloatVar" must then be different from the input "FloatExpr" expression. Thus, the "not in" operation can be evaluated correctly via such a translation.

New "in" and "not in" propagators can be defined for use with mixed integer-floating-point expressions that can be implemented to use the translation strategy described above.

Relational constraint expression types (such as comparison expression types, etc.) can be defined that can used to support mixed integer-floating-point expressions involving multiple-value variable types. For example, a "greater than" expression type can be defined that can be used to constrain all of a set variable's values to be greater than or equal to a value of a given single-value variable. The set variable and the single-value variable can be of different variable types (integer, floating-point, etc.). In a particular embodiment, an expression taking a form of "SetVar>FloatExpr" can be translated as:
SetVar>AuxIntVar
channel(AuxIntVar,AuxFloatVar)
AuxFloatVar>=FloatExpr.

The "AuxIntVar" variable can be initialized with a value domain defined by a minimum integer value and a maximum value that is one less than the largest value in the "SetVar" variable. The "AuxFloatVar" can be initialized with a value domain defined by a minimum value of the "FloatExpr" expression and a maximum floating-point value. The channel constraint can be configured to adjust both domains as needed, i.e. whenever the maximum possible value for "SetVar" decreases or the minimum possible value for "FloatExpr" increases. Analogous translations can be defined for other comparison expressions, such as greater than or equal to, less than, less than or equal to, etc.

Example 6—Example String Expressions

In any of the examples described herein, expressions involving string variables can be provided.

Expressions involving string variables (a.k.a., string expressions) can be used to define constraints in a configuration model. At least some modeling frameworks (such as MiniModel) can be extended to support string expressions. Template constraint expressions, as described herein, can be used to generate string expressions.

Constraint expression types can be provided that can be used to define constraint expressions involving string variables, expressions that result in string values, string constants, or some combination thereof. For example, relational constraint expression types can be defined that can be used to evaluate relationships between string variables, string expressions, or some combination thereof. Example relational constraints for which propagators can be defined include "equal to," "not equal to," "greater than," "greater than or equal to," "less than," "less than or equal to," etc.

For example, "length" constraint expression types can be provided that can that can be used to define expressions involving a length of a string variable (or string output of a string expression). A "length" propagator can be defined that can return an integer value representing a number of characters in a given string parameter. Expressions (such as relational constraint expressions) can be defined involving an output of the length propagator and a given integer variable.

For example, "lowercase" constraint expression types can be provided that can be used to convert a given string variable or output of a given string expression to lowercase. Additionally or alternatively, "uppercase" constraint expression types can be provided that can be used to convert a value of a given string variable or output of a given string expression to uppercase.

For example, "concat" constraint expression types can be defined that can take instances of string types as input and return string expressions representing concatenations of the string type instances. A "concat" constraint expression type can be defined that can take an instance of a string variable array as input and generate a string expression representing a concatenation of the string values in the string variable array. Additionally or alternatively, a "concat" constraint expression type can be defined that can take an instance of a string variable array and a string constant as inputs and generate a string expression representing a concatenation of the string values in the string variable array and the string constant. Additionally or alternatively, a "concat" constraint expression type can be defined that can take two string expressions as input and generate a string expression representing a concatenation of the string outputs of the input string expressions.

In at least some embodiments, a string expression type can be a class that can store string variables, string constants, and/or other instances of the string expression class as a syntax tree. In a different or further embodiment, the string expression type can be a subclass of a base expression type class (such as a base Boolean expression type) provided by a configuration modeling framework (such as MiniModel, etc.). This can allow combinations (such as Boolean combinations) between string expressions and other expressions generated using expression types that are built-in to the modeling framework. String expressions can be included in expressions generated by template constraint expressions.

In at least some embodiments, complex string expressions can be stored as a syntax tree in an instance of a string expression type. A post function of the string expression can be configured to traverse the syntax tree. Nested string expressions can be supported, for example, through the use of auxiliary string variables. For example, auxiliary string variables can be created to represent sub-expressions during traversal of the syntax tree. For example, posting an expression such as "rel (home, x2=concat (uppercase (x0), x1))" can be translated as:
"uppercase (home, x0, aux0)
concat (home, aux0, x1, aux1)
rel (home, x2, Gecode::IRT_EQ, aux0),"
through the creation of auxiliary string variables "aux0" and "aux1."

In at least some embodiments, nested string expressions can be evaluated by introducing intermediate string variables. For example, intermediate string variables can be used to flatten nested string expressions. Such a flattening process can be performed by a post function of a string expression type that is invoked when an instance of the string expression type is posted.

Example 7—Example MiniModel Integration

In any of the examples described herein, the MiniModel framework can be extended to support template constraint expressions.

The MiniModel framework library for Gecode can be used as a starting point for entering configuration rules into Gecode. A number of extensions can be made to MiniModel to support template constraint expressions in Gecode. In particular, these can include extensions to support template Boolean expressions and propagator identifiers as described herein. Extension libraries can be defined to support string expressions and propagators as described herein in template Boolean expressions. Post functions for extension string expression types can be defined to support traversing nested string expressions in template Boolean expressions. Extension libraries can be defined to support mixed integer-floating-point expressions and propagators as described herein in template Boolean expressions. Relational constraints involving multiple-value variables (such as set variables, etc.) and single-value variables can be supported in template Boolean expressions. Additionally or alternatively, domain constraints in template Boolean expressions for various variable types, such as integer variables, set variables, string variables, string set variables, floating-point variables, etc. In at least some embodiments, extensions to MiniModel can be defined to make constraints that are not available in the MiniModel framework available in template Boolean expressions.

Integer relation constraints can be defined that can be used to constrain values of a set variable to satisfy a given relation with respect to a given integer variable. For example, such a relation constraint can take a form such as "rel(home, SetVar,IRT_LE,IntVar)," wherein every value in the "SetVar" set value has to be a least as great as the eventual value of the "IntVar" integer value. Such constraints can be made available through MiniModel extensions for use in template Boolean expressions. In at least some embodiments, such constraints can take a form such as "x<=y," "x==y," etc. The constraint definitions can be defined to support integer variables, integer set variables, or some combination thereof.

Extensions to MiniModel can be defined to support domain constraints for various variable types in template Boolean expressions. Additionally or alternatively, an "element" constraint expression type can be defined that can be used to determine whether a given value is present in a multiple-value variable. Such "element" constraints can be defined for use with various set variable types, array variable types, or the like.

The MiniModel framework can be extended to support template Boolean expressions in a variety of ways. For example, MiniModel can be can be configured to support the introduction of new features through sub-libraries (such as dynamically linked libraries, etc.).

In at least some embodiments, expression translations can be performed that comprise the dynamic addition of variables to a constraint space. In at least some embodiments, such dynamic variable can be accessed in clones of the constraint space. For example, dynamic variables can be stored in a data structure (such as a vector, etc.). When the constraint space is copied, the data structure can be copied and the dynamic variables in the data structure can be updated.

Propagator scheduling can be done using a stack/queue scheduler. Such a scheduler can be used to replace a default propagator scheduler. In at least some cases, replacing the default scheduler with the stack/queue scheduler can provide identical scheduling behavior in a trace mode and a normal operating mode.

Example 8—Example Constraint Propagation Tracing

In any of the examples described herein, constraint propagation can be traced through expression evaluation.

In at least some embodiments, constraint propagation in variable arrays can be traced. For example, a trace recorder can be implemented by a propagator that can be controlled by one or more propagator groups. Propagator groups can be used to track one or more variable traces during a posting of an expression. Such a trace can be used to track variable state throughout execution of an expression.

For example, control propagators for groups can be assigned identifiers. Such identifiers can be set outside of expressions, such as via an argument that is passed in to a post operation targeting the expression. The control propagator can be used for making before-after-snapshots of its propagators. In at least some embodiments, such a control propagator can be configured to track a particular variable throughout the evaluation of an expression. If a control propagator is scheduled with a high priority, then intermediate changes in the evaluation of an expression can be reported. If a control propagator is scheduled at low priority, a summary of changes can be sent after completion of the expression evaluation. A template design for a trace control propagator can be created.

FIG. 4 depicts an example Gecode program 402 comprising example trace operators 404 and 406; and a resulting trace report 450.

The trace operator 404 marks the "intvars" integer variable array for a constraint propagator trace. Similarly, the trace operator 406 marks the "floatvars" floating-point variable array for another constraint propagator trace. Constraint propagation can be traced through Boolean expressions (e.g., 412 and 414). Posting the constraints with the propagator groups 408 and 410 establishes a connection between the propagator groups 408 and 410 and the Boolean expressions 412 and 414, respectively.

The propagator groups 408 and 410 can be used to track the propagations through the traced variables in the Boolean expressions 412 and 414 in the resulting trace report 450. In the example report 450, the propagator groups 408 and 410 have been assigned group identifiers 452 and 454, respectively. The identifiers 452 and 454 can be used to trace the constraint propagation and outcomes of the expressions 412 and 414.

Example 9—Example Dependency Parsing

In any of the examples described herein object dependency definitions can be parsed to create representations of the object dependencies that can be processed by a constraint solver.

Figure 5:
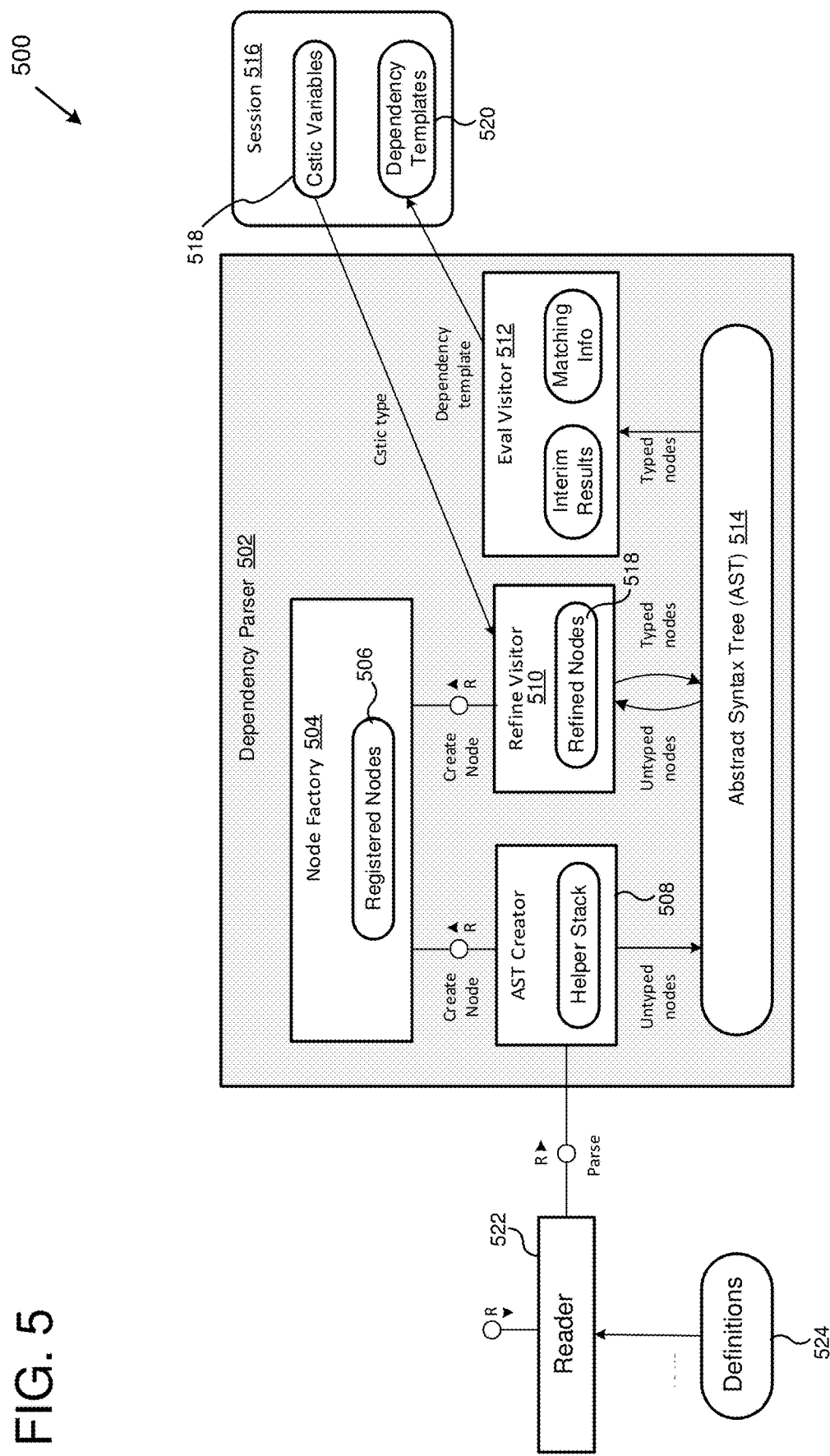
FIG. 5 is a system diagram depicting an example system comprising a dependency parser for creating template constraint expressions.

FIG. 5 is a system diagram depicting an example system 500 comprising a dependency parser 502 for creating template constraint expressions 520. A set of object dependency definitions 524 can be read by an object dependency reader 522 and passed to the dependency parser 502 for parsing. In at least some embodiments, the object dependency definitions 524 can be parsed using an iterative algorithm instead of a recursive algorithm to avoid stack overflows.

The dependency parser 502 can comprise an abstract syntax tree (AST) creator 508 configured to create an AST 514 of untyped nodes. The AST creator 508 can be configured to use a node factory 504 to create the untyped nodes. The node factory 504 can be configured to maintain a register 506 of created nodes. An evaluation visitor 512 can be configured to evaluate the AST 514 representation of the object dependency code and generate one or more expression templates 520. The created one or more expression templates can be stored as one or more dependency templates 520 in a session 516 for subsequent processing by a constraint solver.

A node refine visitor 510 can be configured to analyze the untyped nodes and to create typed nodes for the AST 514. In scenarios where the AST 514 refers to unknown characteristics ("cstics") (such as cstics not supplied in an input data set), unsupported data types, and/or unsupported syntax elements then the parsing process for the dependency object can be aborted. In at least some such scenarios, a warning message can be recorded (such as in a message output table) and the parsing process can continue with a next dependency object.

In order to prevent reoccurring parsing steps if the model structure changes, a first parsing step can generate parametrized template constraint expression objects where not all reference variables have been assigned. In a subsequent step, a final set of referenced variables can be analyzed to determine a "correct" position of the object dependency within in the model. Expressions can then be generated using the template constraint expressions and the mapped variable sets. The generated expressions can then be posted to a constraint solver.

The object dependency definitions 524 can be parsed by creating the AST 514 and iteratively applying a visitor design pattern to the AST 514. The AST 514 can be configured to store node object. The typed nodes can be instances of specialized node classes. The various specialized node classes can be associated with different types of operations as (such as the various types of operators described herein).

In at least some embodiments, each node in the AST 514 can be registered by the node factory 504 at startup. For example, by mapping a node type id and an operation type id to a create function for a node. Type and value strings from the AST 514 can be mapped to corresponding node types and operation identifiers. Thus, in at least some cases for every object dependency, a node can be created using the node factory 504, which can call a corresponding create function for the given node and operation type ids. After a node is created by the AST creator 508 for a given object dependency, the node can be stored in the AST 514.

Node objects can be configured to accept a visitor object, such as the visitor 510 and/or the evaluation visitor 512. A visitor object can support various types of visit operations (such as "visit on enter," "visit on leave," and/or "visit on enter and leave." Different visit operation types can be used to support different strategies for posting the nodes while traversing the AST 514. For example a post order can be implemented as "visit on enter and leave" for leaf nodes and "visit on leave" for non-leaf nodes.

In at least some embodiments, specialized node visitor types can be derived from a base visitor type. Specialized node visitor types can add provide implementations for specific node and visit types. For example, the refine visitor 510 and the evaluation visitor 512 can be derived from the base visitor type.

The refine visitor 510 can be used is used to replace nodes without cstic type information with typed nodes and/or to simplify the structure of the AST 514. The cstic type information can be obtained (for example) from corresponding variable nodes and can propagated to a root of the AST 514 during post-order traversal of the AST 514.

The evaluation visitor 512 can be configured to accept the typed AST nodes and to use type information from the typed nodes to create and store strictly typed intermediate results after evaluating of each node. For example, for a numeric constant node, a value of the corresponding constant can be stored as an interim result. For a variable node, a placeholder of the corresponding type (along with matching information for the placeholder) can be created and stored as an interim result.

The evaluation visitor 512 can be configured to use the interim results to identify matching ASTs for different evaluated object dependencies. For example, two syntax trees can be considered to match if they share a same or similar structure. For example, the syntax trees can be compared to one another to determine if they contain a common pattern of nodes. Using such comparisons it can be determined that two or more of the object dependencies comprise usages of a same constraint rule. For example, the object dependencies may involve a same rule, but use different variables.

Template constraint expressions can be created based on the structures of the object dependencies. For example, variable nodes in a syntax trees can be replaced with placeholder nodes. Variable qualifiers can be created that can be used to map variables to the placeholder nodes of the template constraint expressions when the object dependencies are posted.

For an operation node having a Boolean expression result (such as a comparison), a template Boolean expression can be created from placeholders, constants, and/or corresponding operation interim results. For other types of operation nodes, other types of template constraint expressions can be created.

At least some implementations can support operations that accept single-valued arguments. In such implementations, operations on multi-valued arguments can be realized by adding one or more additional parameters to the node factory 504, defining corresponding nodes types, and/or implementing additional visitor types.

Figure 6:
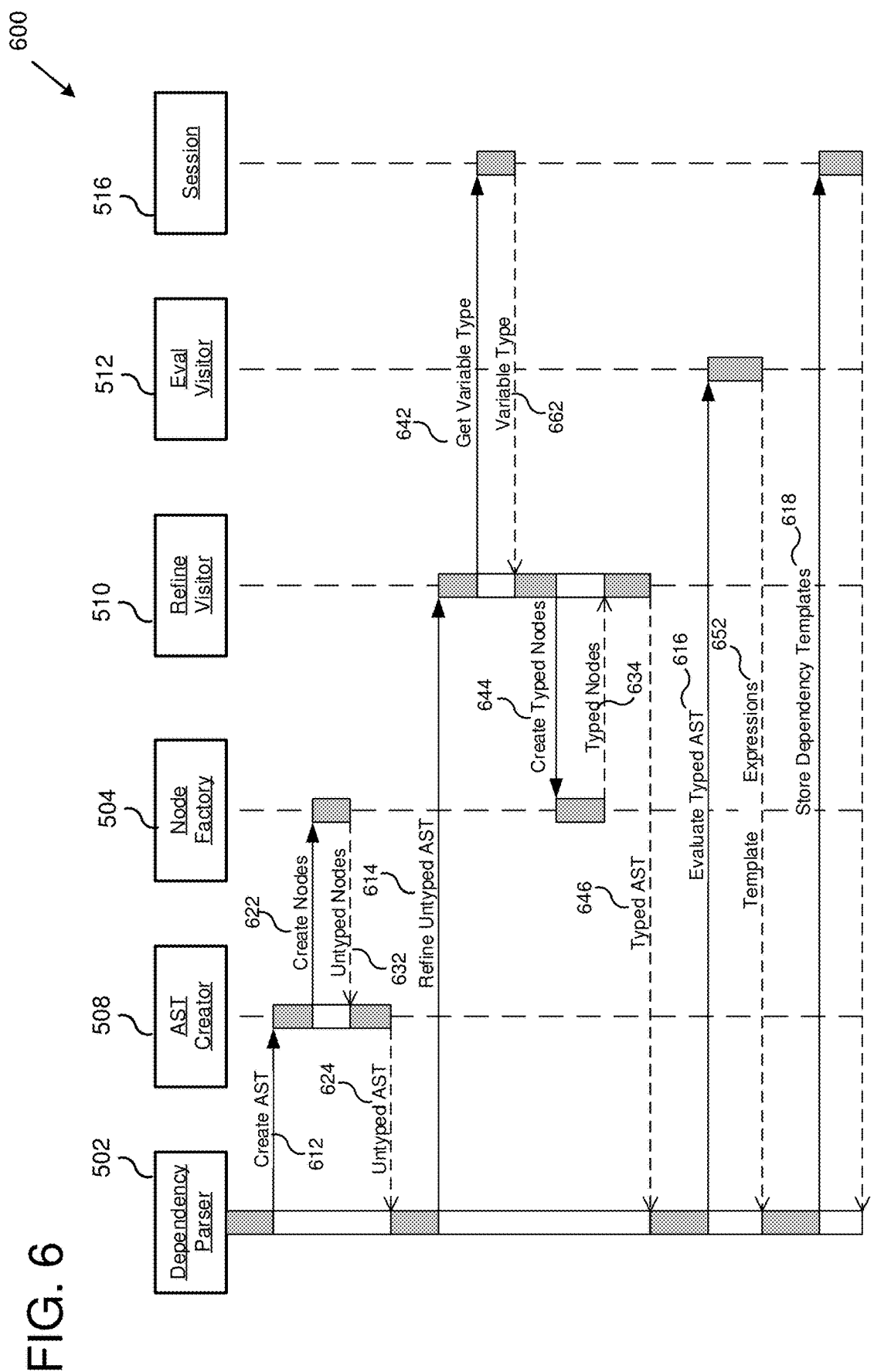
FIG. 6 is a sequence diagram depicting a parsing of object dependency definitions.

FIG. 6 is a sequence diagram depicting a parsing of object dependency definitions. The dependency parser 502 can transmit a command 612 to the AST creator 508 to create a generic AST from a set of object dependency definitions. For object dependencies, the AST creator 508 can transmit commands 622 to the node factory 504 to create nodes. The node factory 504 can be configured to generate and register new untyped nodes 632 that are returned to the AST creator 508. The AST creator can assemble the untyped nodes into an untyped AST 624 that is returned to the dependency parser 502.

The dependency parser can transmit one or more commands 614 to the refine visitor 510 to replace the untyped nodes in the untyped AST with typed nodes. For each node, the refine visitor 510 can transmit a command 642 to the session 516 to retrieve a variable type (such as a cstic type) for the node. The session 516 can be configured to return a variable type 662 for the node to the refine visitor 510. The refine visitor 510 can then transmit commands 644 to the node factory 504 to create typed nodes for the AST using the variable types retrieved from the session 516. The node factory 504 can be configured to return typed nodes 634 to the refine visitor 510 in response. The refine visitor 510 can be configured to replace the untyped nodes in the AST with corresponding typed nodes and return the typed AST 646 to the dependency parser 502.

The dependency parser can be configured to transmit a command 616 to the evaluation visitor 512 to evaluate the typed AST. The evaluation visitor 512 can be configured to analyze the typed AST and generate template constraint expressions 652 based on the typed nodes. The evaluation of a typed node can result in a placeholder or a template constraint expression. Such interim results can be stored in a data structure (such as a vector). An identifier of the corresponding node can be used as an index for locating the interim result in the data structure. The evaluation visitor 512 can return the generated template constraint expressions 652 to the dependency parser 502.

The dependency parser 502 can be configured to create dependency templates 618. A dependency template can be created for a given object dependency by using a template constraint expression representation of the dependency and one or more of the placeholders for additional condition variable(s). The dependency parser 502 can be configured to store the dependency templates 618 in the session 516.

Example 10—Example Computing Systems

Figure 7:
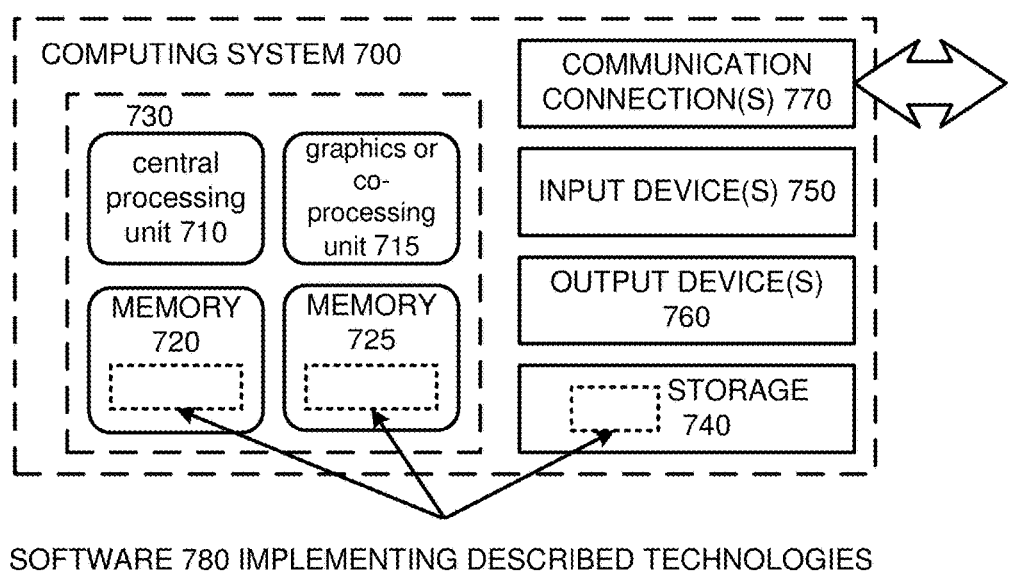
FIG. 7 is a block diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, solid state drives, etc.), or some combination of the two, accessible by the processing unit(s). The memory 720, 725 can store software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, solid state drives, CD-ROMs, DVDs, or any other medium which can be used to store information in a non-transitory way and which can be accessed within the computing system 700. The storage 740 can store instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Example Cloud Computing Environment

Figure 8:
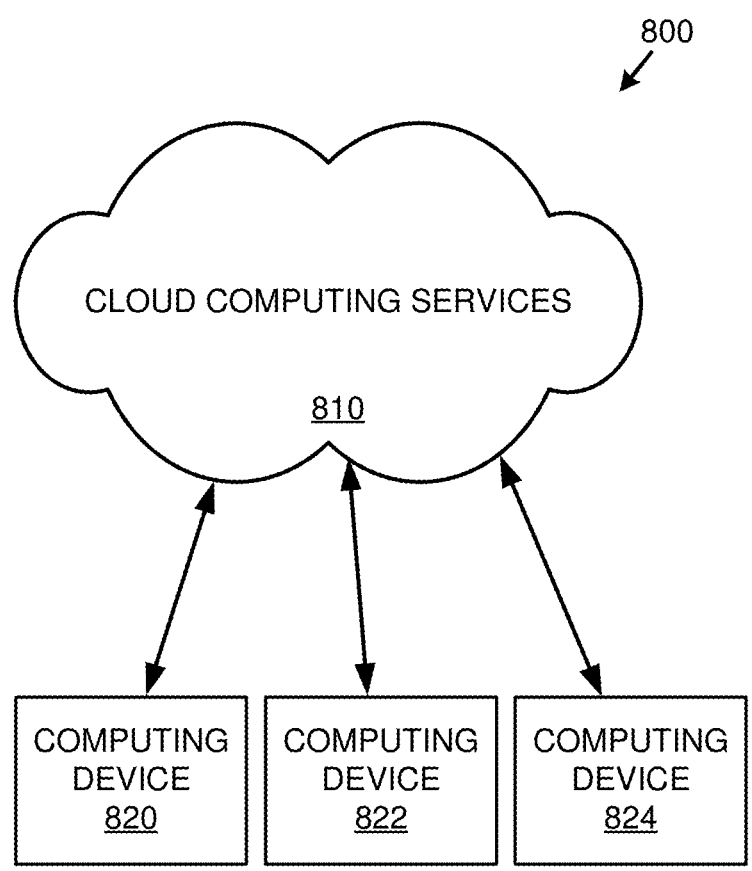
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example 12—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A computer-implemented method, comprising:
   receiving a configuration model definition comprising multiple configuration rule definitions;
   generating a template constraint expression for one of the configuration rule definitions, wherein the template constraint expression comprises one or more variable placeholder identifiers;
   generating a constraint expression for the one of the configuration rule definitions using the template constraint expression, wherein generating the constraint expression for the one of the configuration rule definitions comprises mapping one or more variables associated with the configuration rule definition to the one or more placeholder identifiers of the template constraint expression;
   using a constraint solver to evaluate the generated constraint expression; and
   tracing the evaluation of the generated constraint expression wherein the tracing comprises:
      applying a trace context to one of the one or more variables that is mapped to the one or more placeholder identifiers of the template constraint expression; and
      using a propagator group to trace an application of a propagator to the variable as the one of the generated constraint expressions is evaluated.

2. The computer-implemented method of claim 1, wherein:
   the configuration model comprises a graph of object instances; and
   the generating the constraint expression comprises:
      identifying a subgraph of object instances in the graph that satisfies specified criteria of the template constraint expression; and
      mapping one or more variables in the subgraph to the one or more placeholder identifiers of the template constraint expression.

3. The computer-implemented method of claim 2, wherein the graph of object instances comprises a tree data structure wherein object instances are connected by parent-child relationships.

4. The computer-implemented method of claim 1 wherein a placeholder identifier, of the one or more placeholder identifiers, comprises a variable qualifier that is used to map a variable, of the one or more variables, to the placeholder identifier.

5. The computer-implemented method of claim 1, wherein the template constraint expression is a template Boolean expression; and the constraint expression generated using the template constraint expression is a Boolean expression.

6. The computer-implemented method of claim 1, wherein the template constraint expression comprises a mixed integer-floating-point expression.

7. The computer-implemented method of claim 1, wherein:

the template constraint expression comprises a string expression; and the generating the constraint expression for the one of the configuration rule definitions using the template constraint expression comprises flattening the string expression.

8. The computer-implemented method of claim 1, wherein the generating the constraint expression for the one of the configuration rule definitions using the template constraint expression comprises:

translating the template constraint expression into a format that is executable by the constraint solver.

9. The computer-implemented method of claim 1, wherein the received configuration model definition comprises a representation of the configuration rule definitions defined using a MiniModel framework; and the generated constraint expression for one of the configuration rule definitions using the template constraint expression comprises generating a representation of the configuration rule definition that can be evaluated by a Gecode constraint solver.

10. The computer-implemented method of claim 1, further comprising:

generating a second constraint expression using the template constraint expression, wherein generating the second constraint expression comprises mapping another one or more variables to the one or more placeholder identifiers of the template constraint expression; and using a constraint solver to evaluate the second constraint expression.

11. A system comprising a computing device comprising one or more processors and a memory storing instructions that, when executed by the one or more processors, cause the computing device to perform operations, the operations comprising:

receiving a configuration model definition comprising multiple configuration rule definitions for evaluation using a constraint solver;

generating a template constraint expression for one of the configuration rule definitions, wherein the template constraint expression comprises a variable placeholder identifier;

generating one or more constraint expressions using the template constraint expression, wherein generating a constraint expression comprises mapping one or more variables to the one or more variable placeholder identifiers of the template constraint expression; and tracing an evaluation of one of the one or more generated constraint expressions, wherein the tracing comprises:

applying a trace context to a variable associated with the configuration rule definition that is mapped to the template constraint expression; and using a propagator group to trace an application of a propagator to the variable as the one of the generated constraint expressions is evaluated.

12. The system of claim 11, wherein:

the configuration model definition comprises an object instance graph; and generating a constraint expression, of the one or more constraint expressions, comprises:

matching a subgraph of object instances in the object instance graph to the template constraint expression; and mapping one or more variables of the one or more matched object instances to the one or more variable placeholder identifiers of the template constraint expression.

13. The system of claim 12, wherein the object instance graph comprises a tree data structure, wherein object instance nodes are connected by parent-child relationships.

14. The system of claim 12, wherein the generating the one or more constraint expressions comprises:

matching multiple subgraphs of object instances in the object instance graph to the template constraint expression; and generating a constraint expression for each of the matched subgraphs.

15. The system of claim 11, wherein a placeholder identifier, of the one or more placeholder identifiers, comprises a variable qualifier that is used to map a variable, of the one or more variables, to the placeholder identifier.

16. The system of claim 11, wherein the template constraint expression is a template Boolean expression; and the one or more constraint expressions generated using the template constraint expression are Boolean expressions that can be evaluated by the constraint solver.

17. The system of claim 11, wherein:

the template constraint expression comprises a string expression; and the generating the one or more constraint expressions for the configuration rule definitions using the template constraint expression comprises:

instantiating an instance of a string expression type for the string expression; and flattening the string expression using the instance of the string expression type.

18. The system of claim 11, wherein the multiple configuration rule definitions are defined using a MiniModel framework; and the constraint solver is a Gecode constraint solver configured to evaluate the template constraint expression.

19. One or more computer-readable hardware storage media storing instructions that, when executed by one or more processors, cause the one or more processors to perform operations, the operations comprising:

receiving a configuration model definition comprising an object instance graph and multiple configuration rule definitions;

generating a template constraint expression for one of the configuration rule definitions, wherein the template constraint expression comprises matching criteria and a variable placeholder comprising a variable qualifier;

generating multiple constraint expressions using the template constraint expression, wherein the generating the constraint expressions comprises:

identifying multiple subgraphs of object instances in the object instance graph that satisfy the matching criteria of the template constraint expression, and generating a constraint expression for each of the identified subgraphs, wherein generating a constraint expression comprises mapping a variable of a subgraph to the variable placeholder of the template constraint expression using the variable qualifier;

evaluating the constraint expressions using a constraint solver; and tracing the evaluation of the constraint expressions, wherein the tracing comprises:
applying a trace context to the variable that is mapped to the template constraint expression, and
using a propagator group to trace an application of a propagator to the variable as the one of the generated constraint expressions is evaluated.

* * * * *